United States Patent
Manroa et al.

(10) Patent No.: US 7,738,899 B1
(45) Date of Patent: Jun. 15, 2010

(54) SYSTEM AND METHOD FOR GROUPS COMPRISING NON-COMMUNICATION ADDRESS OBJECTS

(75) Inventors: Arun Manroa, Herndon, VA (US); Ojas Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 574 days.

(21) Appl. No.: 11/693,140

(22) Filed: Mar. 29, 2007

(51) Int. Cl.
*H04B 7/00* (2006.01)

(52) U.S. Cl. .................... 455/519; 455/518; 455/412.2; 455/414.1; 705/14; 705/26

(58) Field of Classification Search ................. 455/518, 455/519, 456.5, 412.2, 414.1, 552.1; 705/14, 705/26, 41, 5, 3, 80, 37, 27; 707/9; 709/203, 709/245, 223
See application file for complete search history.

(56) References Cited

U.S. PATENT DOCUMENTS

| | | | |
|---|---|---|---|
| 6,611,881 B1 * | 8/2003 | Gottfurcht et al. ............ 710/18 |
| 2002/0138649 A1 * | 9/2002 | Cartmell et al. ............. 709/245 |
| 2004/0205394 A1 * | 10/2004 | Plutowski ..................... 714/21 |
| 2005/0186970 A1 * | 8/2005 | Yates et al. .............. 455/456.5 |
| 2005/0232406 A1 * | 10/2005 | Kauppinen ............. 379/202.01 |
| 2007/0054687 A1 * | 3/2007 | Akita et al. ................. 455/518 |
| 2007/0220005 A1 * | 9/2007 | Castro Castro et al. ......... 707/9 |
| 2007/0239552 A1 * | 10/2007 | Sundaresan .................. 705/26 |
| 2007/0244758 A1 * | 10/2007 | Xie ............................. 705/14 |
| 2008/0008106 A1 * | 1/2008 | Boberg et al. ............... 370/270 |
| 2008/0057992 A1 * | 3/2008 | Griffin ........................ 455/518 |
| 2008/0133426 A1 * | 6/2008 | Porat et al. .................... 705/80 |
| 2008/0313705 A1 * | 12/2008 | Mousseau ....................... 726/2 |
| 2009/0157798 A1 * | 6/2009 | Laumen et al. ............. 709/203 |

* cited by examiner

*Primary Examiner*—Tan Trinh

(57) ABSTRACT

Systems and methods of supporting groups that include non-communication address objects are provided. The non-communication address objects can be, for example, items on a shopping list or items on a task list. An application server can receive an unstructured list of non-communication address objects and generate a structured list. The application server sends a request to a group server to create a group that includes non-communication address objects. The group server generates a globally unique group identification and then distributes the globally unique group identification to members of the group.

16 Claims, 9 Drawing Sheets

SYSTEM AND METHOD FOR GROUPS COMPRISING NON-COMMUNICATION ADDRESS OBJECTS

CROSS-REFERENCE TO RELATED APPLICATIONS

The present application is related to U.S. patent application Ser. No. 11/706,219, entitled "Systems and Methods for Opt-In and Opt-Out Talk Group Management"; U.S. patent application Ser. No. 11/706,217, entitled "Systems and Methods for Talk Group Distribution"; U.S. patent application Ser. No. 11/706,218, entitled "Systems and Methods of Group Distribution for Latency Sensitive Applications"; and U.S. patent application Ser. No. 11/706,224, entitled "Talk Group Management Architecture", all of which were filed on Feb. 15, 2007, and all of which are herein expressly incorporated by reference.

BACKGROUND OF THE INVENTION

The aforementioned patent applications relate to systems and methods for supporting communication groups. Information about the communication groups are stored in a Group List Management Server (GLMS), where the information includes a globally unique group identification and communication addresses of communication units for each member of the communication group.

SUMMARY OF THE INVENTION

It has been recognized that the systems and methods of the GLMS architecture of the aforementioned patent applications can be extended to provide additional services using non-communication address objects. In accordance with exemplary embodiments of the present invention, a group server includes a group list that comprises a globally unique group identification and one or more non-communication address objects. The non-communication address objects can be, for example, items for a shopping list or items for a task list. An application server can interact with communication units to receive a request to create a group that comprises non-communication address objects. If the request includes a non-structured list of the non-communication address objects, the application server can structure the list, and then send a request to the group server to create the group. The group server generates a globally unique group identification and stores this identification along with the structured or unstructured list.

When the non-communication address objects are items for a shopping list, the group server can notify suppliers of one or more of the items of the shopping list, and the application server can receive offers for sale for one or more of the items. The application server can aggregate the offers and provide the aggregated offers to the group creator, who can then accept one or more of the offers for sale.

When the non-communication address objects are items for a task list, the group server can notify other communication units of the task list. A communication unit can be notified if the communication unit is subscribed to the task list either due to an earlier subscription to groups created by the group creator or by being identified in the request to create the group. The application server monitors the status of each of the items on the task list, and can update the status of an item based on messages received from subscribers to the task list. The application server can notify the group server when changes are made to the task list, and the group server can then notify the other subscribers to the task list of the changes.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
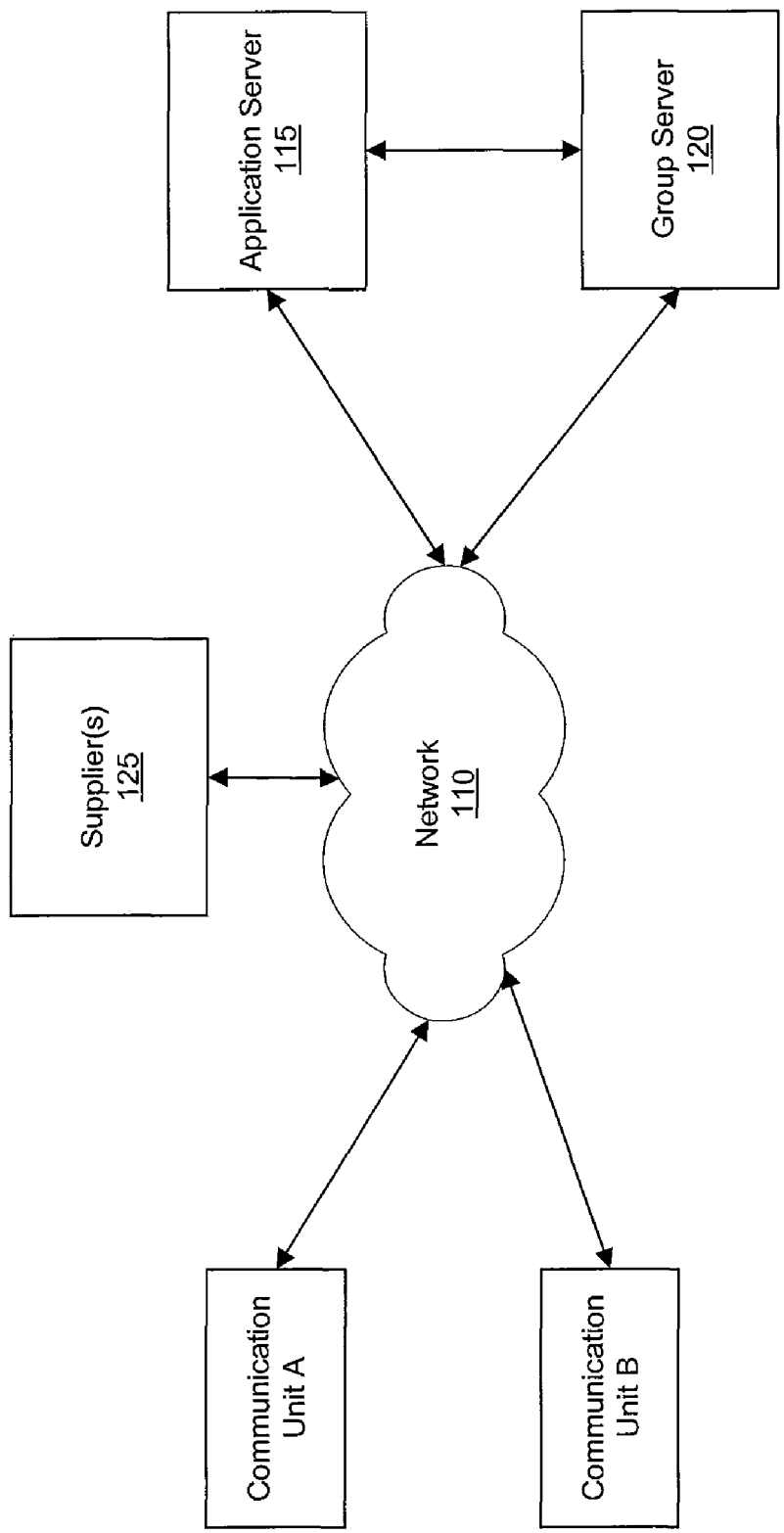
FIG. 1 is a block diagram of an exemplary system in accordance with the present invention

FIG. 1 is a block diagram of an exemplary system in accordance with the present invention. The system includes communication units A and B coupled, via network 110, to application server 115 and group server 120. Communication units A and B can be any type of communications units, including wireless or wired communication units, such as telephones, personal digital assistants, desktop or laptop computers, biometric device and implants and/or the like. As will be described in more detail below, for communication groups comprising a shopping list as a non-communication address object, the system will include one or more suppliers 125. For communication groups comprising a task list, the communication units can be associated with people who are individually or jointly assigned tasks in the list. Although FIG. 1 illustrates only two communication units, the system can include more than two communication units. Moreover, a user can be associated with more than one communication unit, each of which can interact with application server 115 and group server 120.

Application server 115 can be any type of server, and provides various functionality in connection with non-communication address objects, as described in more detail below. Group server 120 can be a GLMS that is described in the aforementioned patent applications, or can be any other type of group list management server. Network 110 can be more than one network, and can be any type of wireless and/or wireline network, including a voice network and/or a data network. Although FIG. 1 illustrates communication units A and B and one or more suppliers 125 being coupled to application server 115 and group server 120 via the same network 110, these communication units and suppliers can be coupled by different networks.

Figure 2:
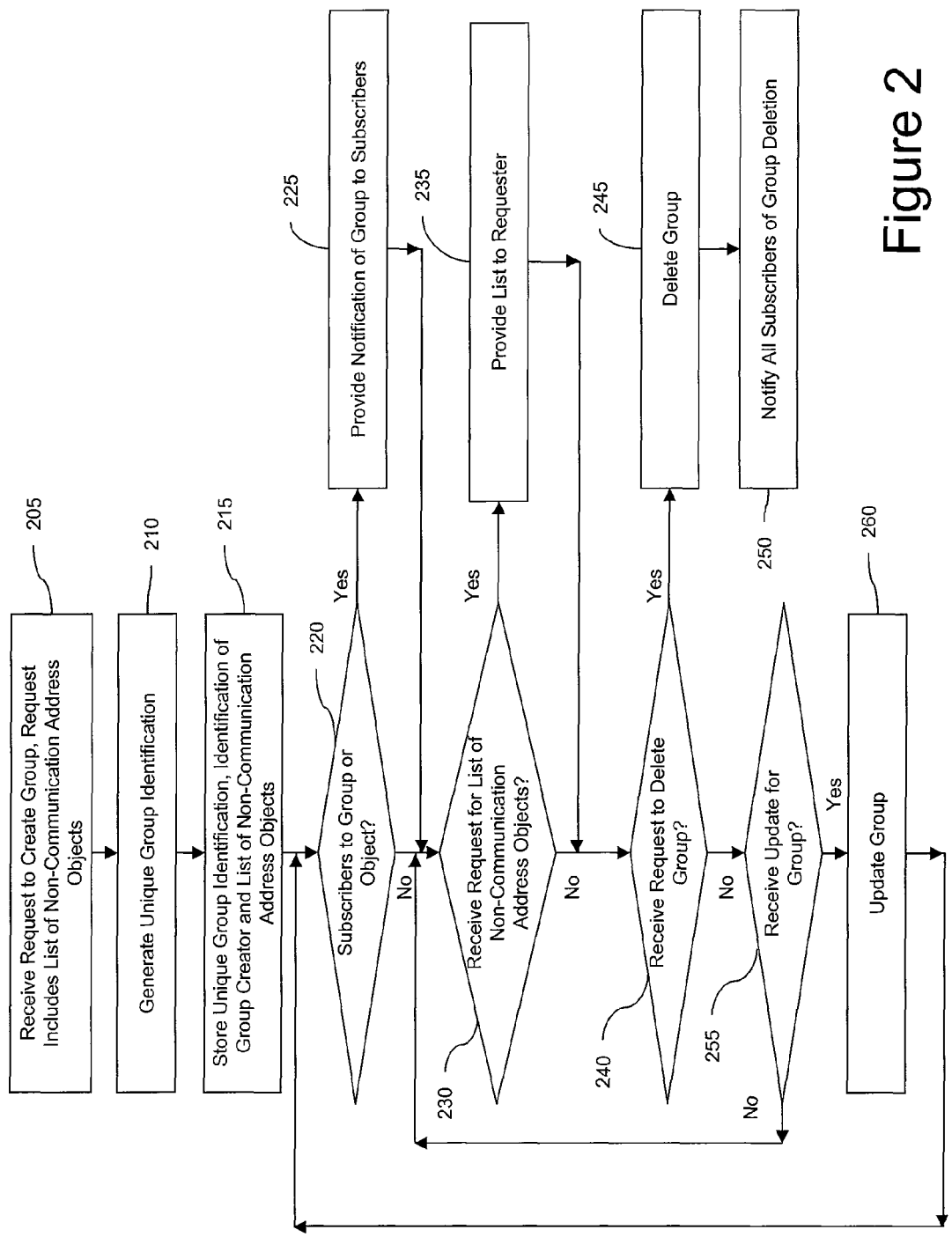
FIG. 2 is a flow diagram of an exemplary method for a group server supporting groups composed of non-communication address objects in accordance with the present invention.

FIG. 2 is a flow diagram of an exemplary method for a group server supporting groups composed of non-communication address objects in accordance with the present invention. Initially, group server 120 receives a request to create a group from one of the communication units A or B by way of application server 115 (step 205). The request includes a list of non-communication address objects (e.g., shopping list items or task list items). Group server 120 generates a unique group identification, and stores the unique group identification, an identification of the creator of the group and the list of non-communication address objects (steps 210 and 215). User preferences can also be stored with the list of non-communication address objects. These user preferences can be included in the request to create the group or can be obtained from a subscriber profile service (not illustrated). When non-communication address objects are shopping list object, the user preferences can be, for example, preferred suppliers, offer limitations (e.g., only offers for every item on the list), and/or the like. The unique group identification, identification of the creator of the group, list of non-communication address objects and user preferences can be stored, for example, in an eXtensible Markup Language (XML) document.

Group server 120 then determines whether there are any subscribers to the communication group, categories of objects or the objects (step 220). The communication request of step 205 can identify subscribers to the communication group. When the communication request identifies preferred suppliers or task list delegates, the opt-in or opt-out functionality described in the aforementioned patent applications can be employed for determining whether the subscribers become members of the group. Moreover, subscribers may have subscribed to the objects or group prior to the request to create the group. For example, a subscriber could subscribe to all groups created by a particular user, all groups containing particular non-communication address objects and/or all groups containing non-communication address objects in particular categories. When there are subscribers to the group or non-communication address objects ("Yes" path out of decision step 220), then group server 120 notifies the subscribers of the group and provides the unique group identification (step 225).

When there are no subscribers to the group or non-communication address objects ("No" path out of decision step 220) or after any subscribers are notified (step 225), then group server 120 determines whether it has received any requests for a list of the non-communication address objects (step 230). Non-subscribers can become aware of the group by searching for groups using, for example, a portal, and can join a group using techniques described in U.S. patent application Ser. No. 11/963,234, entitled "Joining Groups" filed on even date herewith, the entire disclosure of which is herein expressly incorporated by reference. Additionally, or alternatively, to subscribers being notified of a group and then requesting the list of objects (steps 220-230), the list of objects can be provided to subscribers when they are notified of the group. When the system does not automatically notify group members of updates to the lists (i.e., using a "push" function), the requesting function of step 230 can be employed by members of the group to obtain updates (i.e., using a "pull" function). When group server 120 has received a request for the list ("Yes" path out of decision step 230), then group server 120 provides the list to the requestor (step 235).

When group server 120 has not received a request for the list ("No" path out of decision step 230) or after the list is provided to a requestor (step 235), group server 120 determines whether it has received a request to delete the group (step 240). Because lists that include non-communication address objects may have a limited lifetime, e.g., all items on a task list being completed or all items on a shopping list being fulfilled, the deletion of these groups allows reuse of the globally unique group identification. This request can be received from an application server that supports the non-communication address functionality and/or the group server can delete groups after a predetermined condition occurs, such as passage of a period of time. When group server 120 receives such a request ("Yes" path out of decision step 240), then group server 120 deletes the group and notifies all subscribers to the group of the deletion (steps 245 and 250).

When group server 120 does not receive a request to delete a group ("No" path out of decision step 240), group server 120 then determines whether it has received an update for the group (step 255). When group server 120 receives an update for the group ("Yes" path out of decision step 255), then the group is updated (step 260) and it is determined whether there are any subscribers to the group or object (step 220). When group server 120 does not receive an update to for the group ("No" path out of decision step 255), then the group server determines whether it has received a request for the list of non-communication address objects (step 230).

Figure 3:
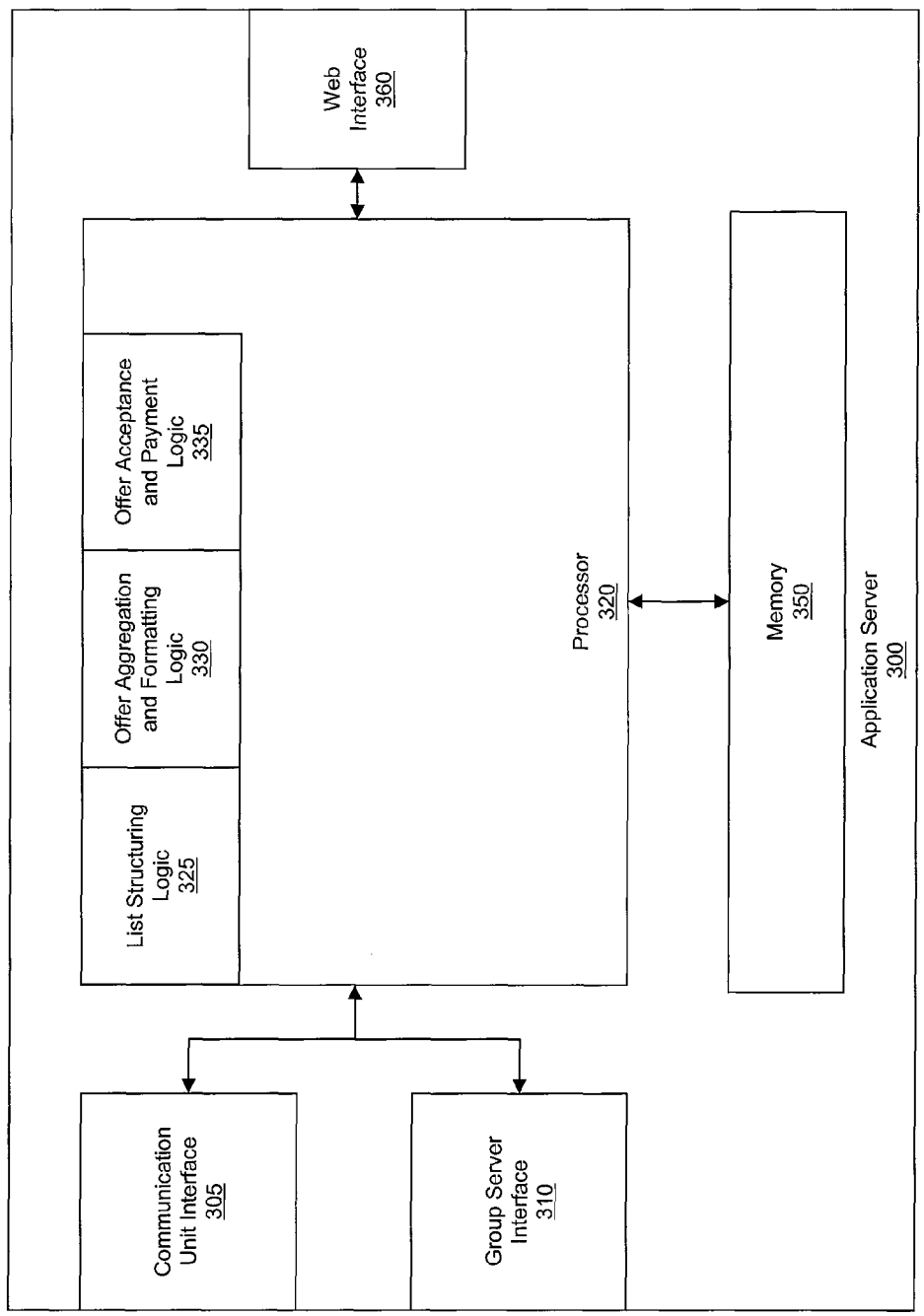
FIG. 3 is a block diagram of an exemplary application server in accordance with a first aspect of the present invention.

FIG. 3 is a block diagram of an exemplary application server in accordance with a first aspect of the present invention. Application server 300 includes communication unit interface 305 for communicating with communication units A and B, and group server interface 310 for communicating with group server 120. Application server 300 can also include web interface 360 that can be used to receiver offers from suppliers. Communication unit interface 305 can include a number of different communication unit interfaces, depending upon the types of communication networks in which communication units A and B are currently being supported. Interfaces 305, 310 and 360 are coupled to processor 320, which in turn is coupled to memory 350. Processor 320 includes logic 325-335, and can be any type of processor, including a microprocessor, field programmable gate array (FPGA) and/or an application specific integrated circuit (ASIC). Memory 350 can be any type of memory, and when processor 320 is a microprocessor, memory 350 can store logic 325-335 as processor-executable code. Logic 325-335 will be described in more detail below in connection with FIG. 4.

Figure 4:
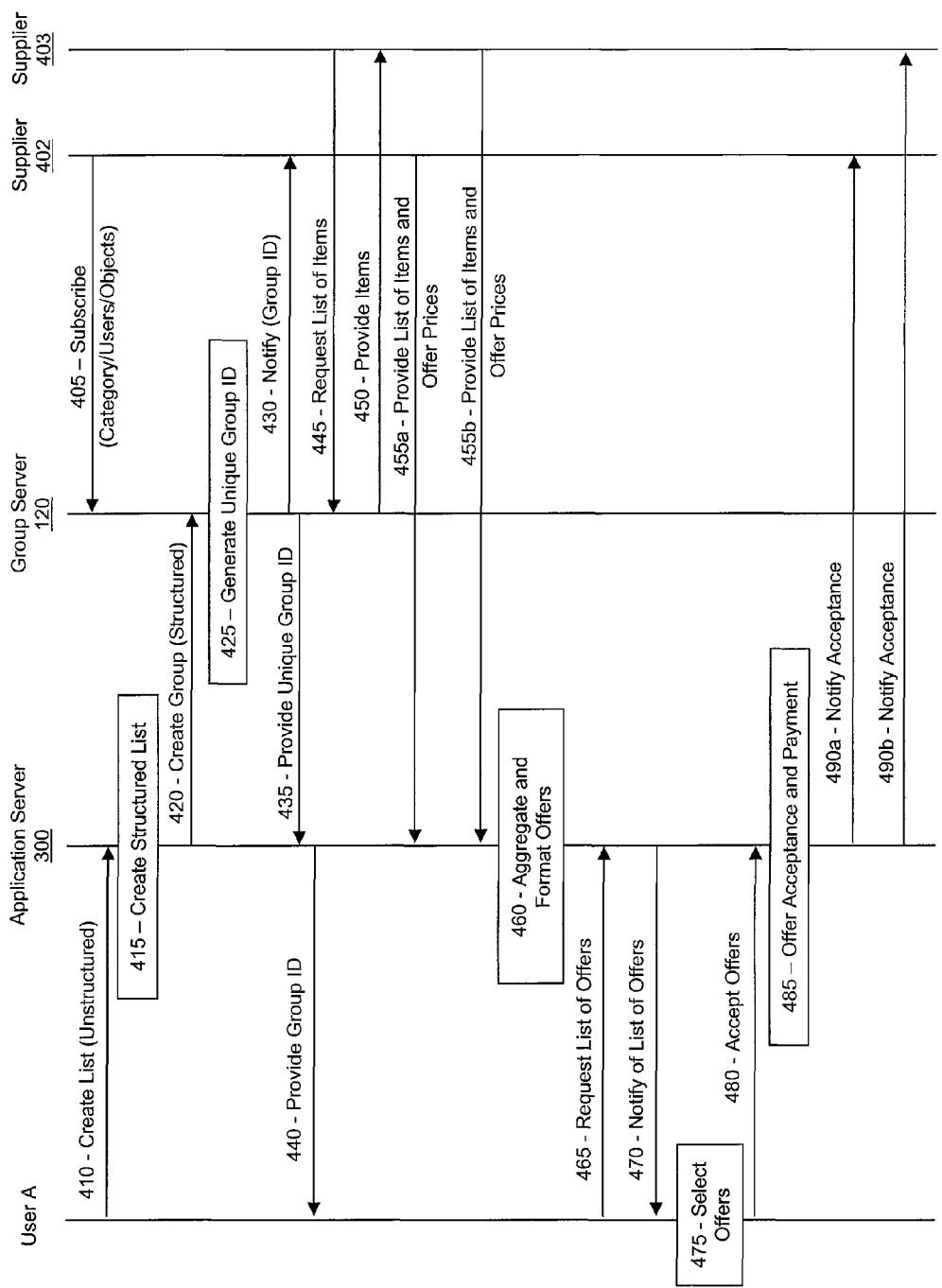
FIG. 4 is a call flow diagram of an exemplary method in accordance with a first aspect of the present invention.

FIG. 4 is a call flow diagram of an exemplary method in accordance with a first aspect of the present invention. In the call flow of FIG. 4 User A can be associated with one or more communication units, any of which can interact with application server 300 and group server 120 in the manner described below. Supplier 402 is a supplier that has a subscription to categories or objects in User A's list, or to lists created by User A, and supplier 403 is a supplier that sends a request for lists that include particular categories or objects, or to lists created by particular users. Although not illustrated, one or more suppliers may be notified of User A's list due to User A's preferences for particular suppliers.

Initially, group server 120 can receive a subscription to categories, users and/or objects from supplier 402 (step 405). When application server 300 receives a request to create a group with an unstructured list of non-communication address objects from User A via interface 305 (step 410), logic 325 creates a structured list (step 415).

Figure 5:
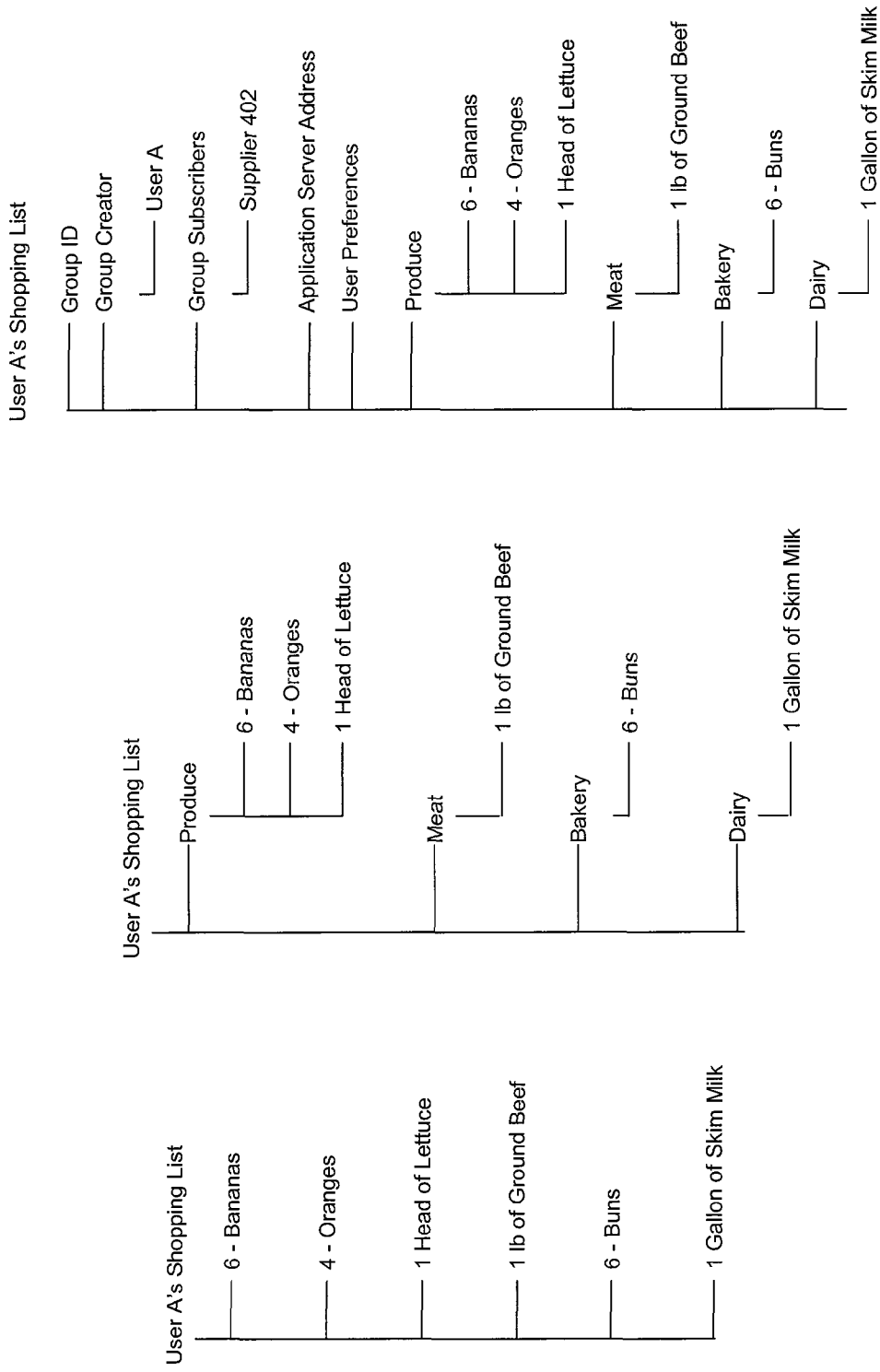
FIGS. 5A-5C are exemplary shopping lists in accordance with the first aspect of the present invention.

FIGS. 5A-5C are exemplary shopping lists in accordance with the first aspect of the present invention. The list of FIG. 5A is an exemplary unstructured list provided by a communication unit, and FIG. 5B is an exemplary structured list generated by logic 325 from the list of FIG. 5A. As illustrated in FIG. 5B, the structured list places the non-communication address objects into different categories. The use of categories allows suppliers to subscribe to categories that can include a number of items, instead of subscribing to each individual item. The list of FIG. 5C is a structured list that also includes the unique group identification, address of the application server, user preferences, and identification of the group creator and subscribers to the group. This list can be stored in group server 120, application server 300, and can be provided to suppliers 402 and 403.

Processor 320 of application server 300 then transmits a request to create a group with the structured list and the address of the application server over interface 310 to group server 120 (step 420). Group server generates a unique group identification, and stores the unique group identification, an identification of User A, the address of application server 120 and the structured list (step 425). Group server 120 then sends a Notify message with the unique group identification to all subscribers to the users, categories, and/or objects of the group (step 430). Group server 120 also sends a message with the unique group identification to application server 300 (step 435). Processor 310 of application server 300 receives a unique group identification from group server 120, stores the unique group identification along with User A's identification and the structured list, and sends a message to User A with the unique group identification (step 440).

One or more suppliers 403 that are interested in making offers for sale send a request for the list of items to group server 120 (step 445), which responds with the list of items (step 450). Additionally, or alternatively, as described above in connection with FIG. 2, group server 120 can send the list with the message notifying the supplier of the creation of the group, if desired. Suppliers 402 and 403 can then make offers for sale for one or more of the items by sending the offer prices for the particular items to application server 300, which is identified by an address in the Notify or provide items messages (steps 455a and 455b). Suppliers 402 and 403 can make various types of offers for sale, such as discounts for purchasing a number of items on the list from the supplier, discounts for purchasing more than a particular quantity of an item from the supplier, coupons for futures purchases from the supplier, etc.

Logic 330 of application server 300 receives offers over interface 360, aggregates and formats the offers (step 460). The offers can be formatted in a variety of different ways, such as by supplier, by item, etc. Additionally, the offers can be formatted based on the type communication unit associated with User A. In this case, application server 300 can store information about type of communication unit associated with User A, or can obtain this information from the group server 120 or another network element (not illustrated).

User A can send a request for the list of the offers for sale (step 465) and receive a list of the aggregated and formatted offers for sale (step 470). Alternatively, after a predetermined amount of time or after a predetermined number of offers for sale have been received, application server 300 can send (not illustrated) the aggregated and formatted list of offers for sale to User A.

User A then selects one or more offers for sale (step 475) and sends a message accepting the offers for sale to application server 300 (step 480). Offer acceptance and payment logic 335 of application server 300 can then receive the acceptance and payment information and notify suppliers 402 of acceptance of the offers for sale (steps 485, 490a and 490b). If desired, offer acceptance and payment logic 335 can use payment and shipping information provided by User A with the acceptance, or stored in memory 350, to complete the transaction with suppliers 402. Offer acceptance and payment logic 335 can also hide the user payment and shipping information, if desired. Moreover, User A can click on a uniform resource locator (URL) in the offer to hyperlink to a website of a supplier where User A can complete the transaction by providing payment and shipping information.

Figure 6:
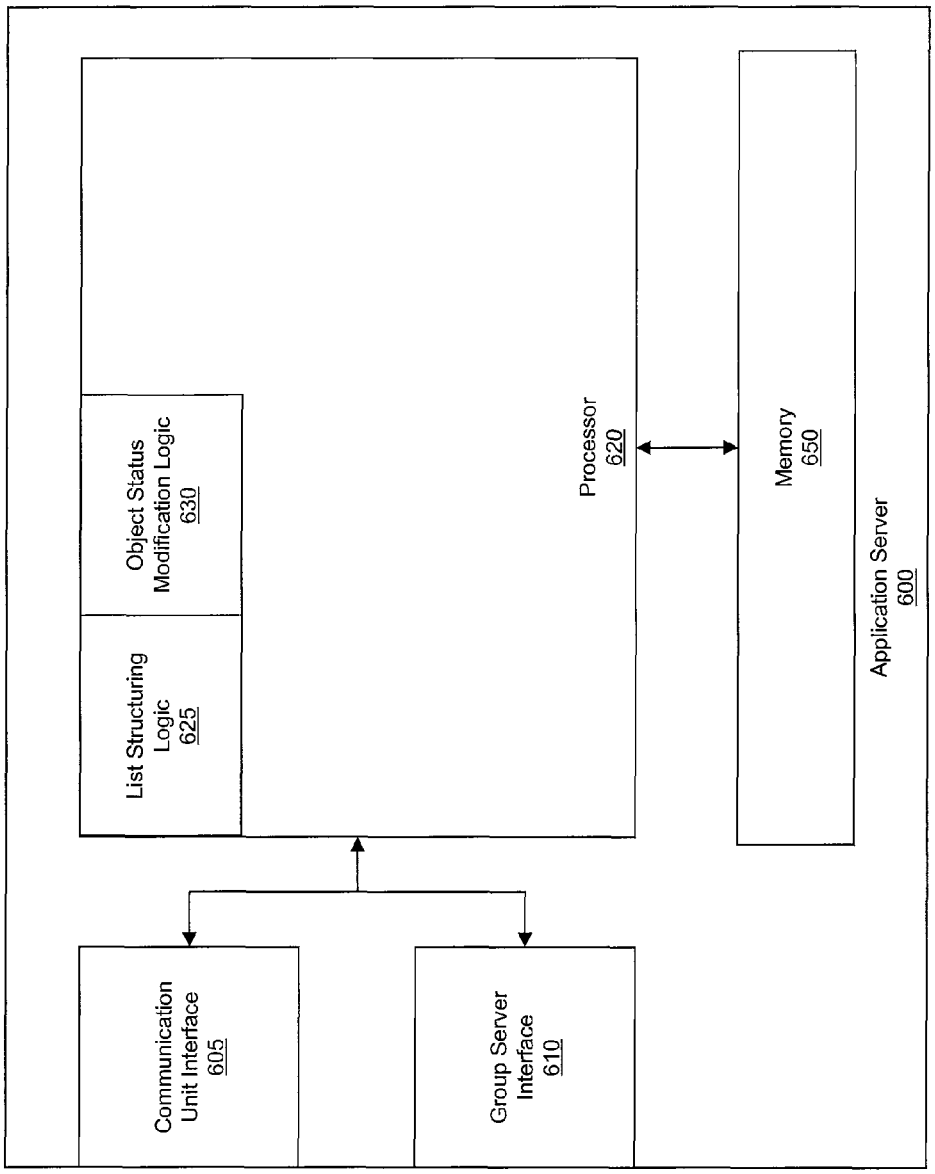
FIG. 6 is a block diagram of an exemplary application server in accordance with a second aspect of the present invention.

FIG. 6 is a block diagram of an exemplary application server in accordance with a second aspect of the present invention. Application server 600 includes communication unit interface 605 for communicating with communication units A and B, and group server interface 610 for communicating with group server 120, both of which operate in a similar manner to that described above in connection with application server 300. Interfaces 605 and 610 are coupled to processor 620, which in turn is coupled to memory 650. Processor 620 includes logic 625 and 630, and can be any type of processor, including a microprocessor, field programmable gate array (FPGA) and/or an application specific integrated circuit (ASIC). Memory 650 can be any type of memory, and when processor 620 is a microprocessor, memory can store logic 625 and 630 as processor-executable code. Logic 625 and 630 will be described in more detail below in connection with FIG. 7.

Figure 7:
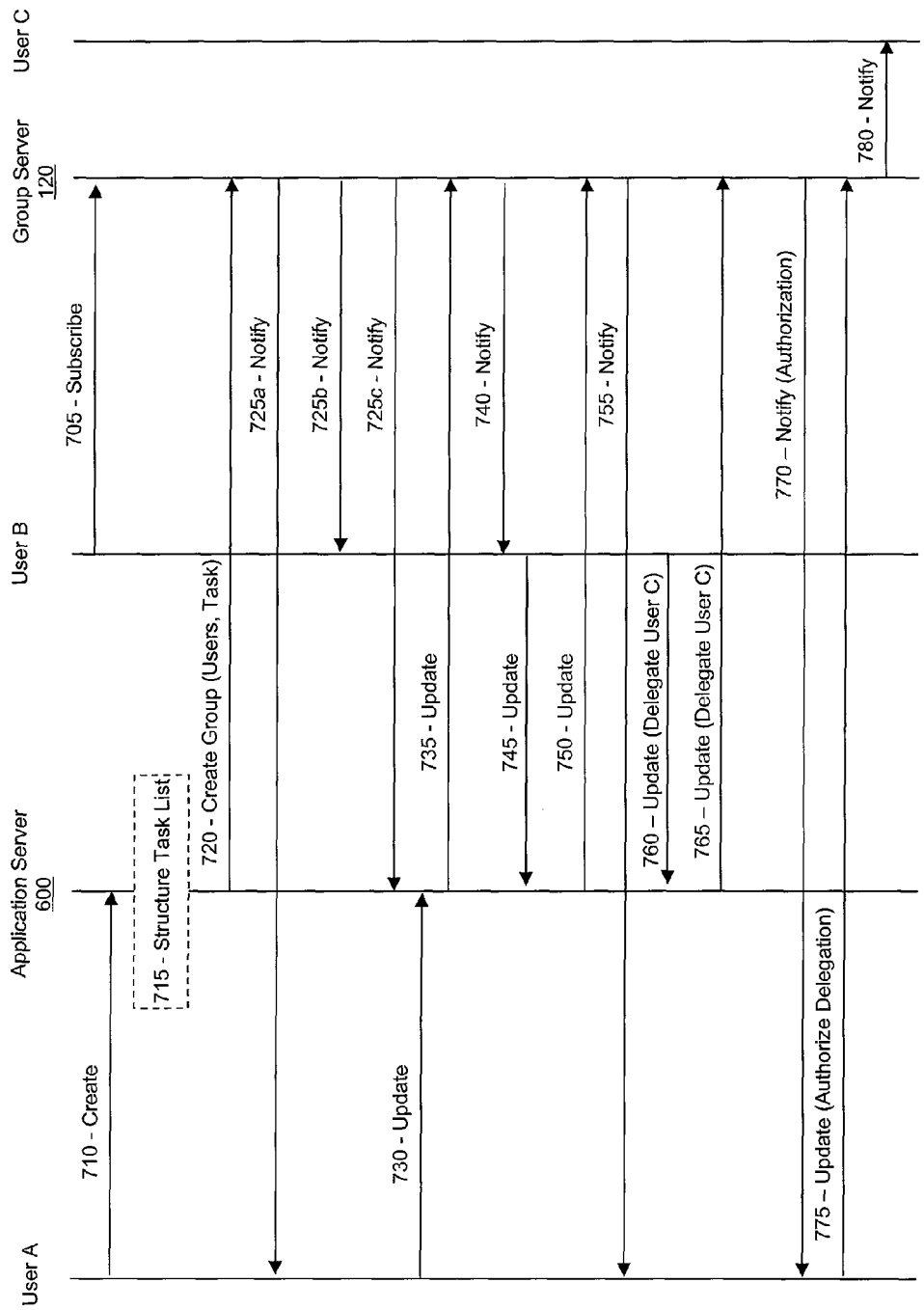
FIG. 7 is a call flow diagram of an exemplary method in accordance with a second aspect of the present invention.

FIG. 7 is a call flow diagram of an exemplary method in accordance with a second aspect of the present invention. In the call flow diagram of FIG. 7 Users A and B can each be associated with one or more communication units, any of which can interact with application server 600 and group server 120 in the manner described below. In the exemplary call flow diagram User B can subscribe to groups created by User A by sending a Subscribe message (step 705). At some later time, User A sends a message to create a task list to application server 600 (step 710). This message can include a number of tasks, as well as identifying additional users associated with the task list, if desired. Logic 625 of application server 600 can structure the list of tasks received from User A (step 715).

Figures 8A, 8B:
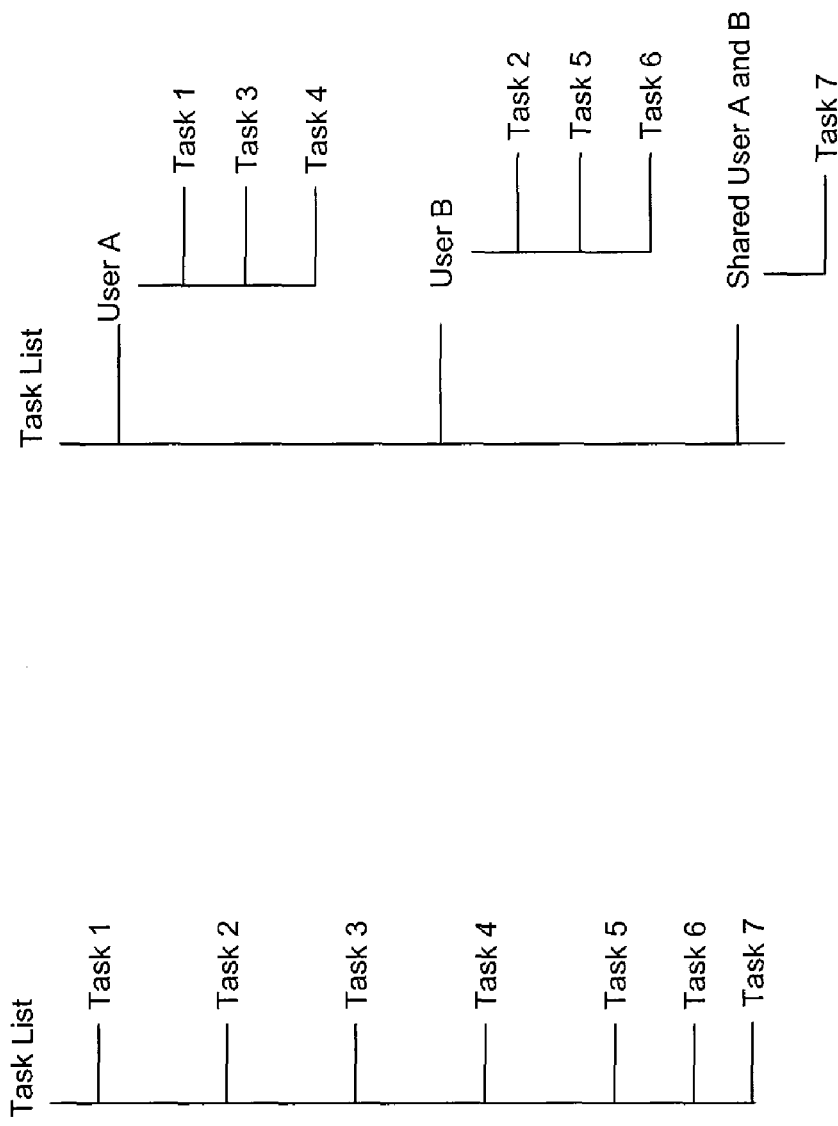
FIGS. 8A-8D are exemplary task lists in accordance with the second aspect of the present invention.

The list of tasks can be an unstructured list, such as that illustrated in FIG. 8A. An optional function that can be implemented by application server 600 is structuring task lists. FIG. 8B illustrates a task list structured by Users. In this case the unstructured task list can include an identification of one or more users assigned to a task. Moreover, as illustrated in FIG. 8B, tasks may be assigned to more than one user, if desired.

Figures 8C, 8D:
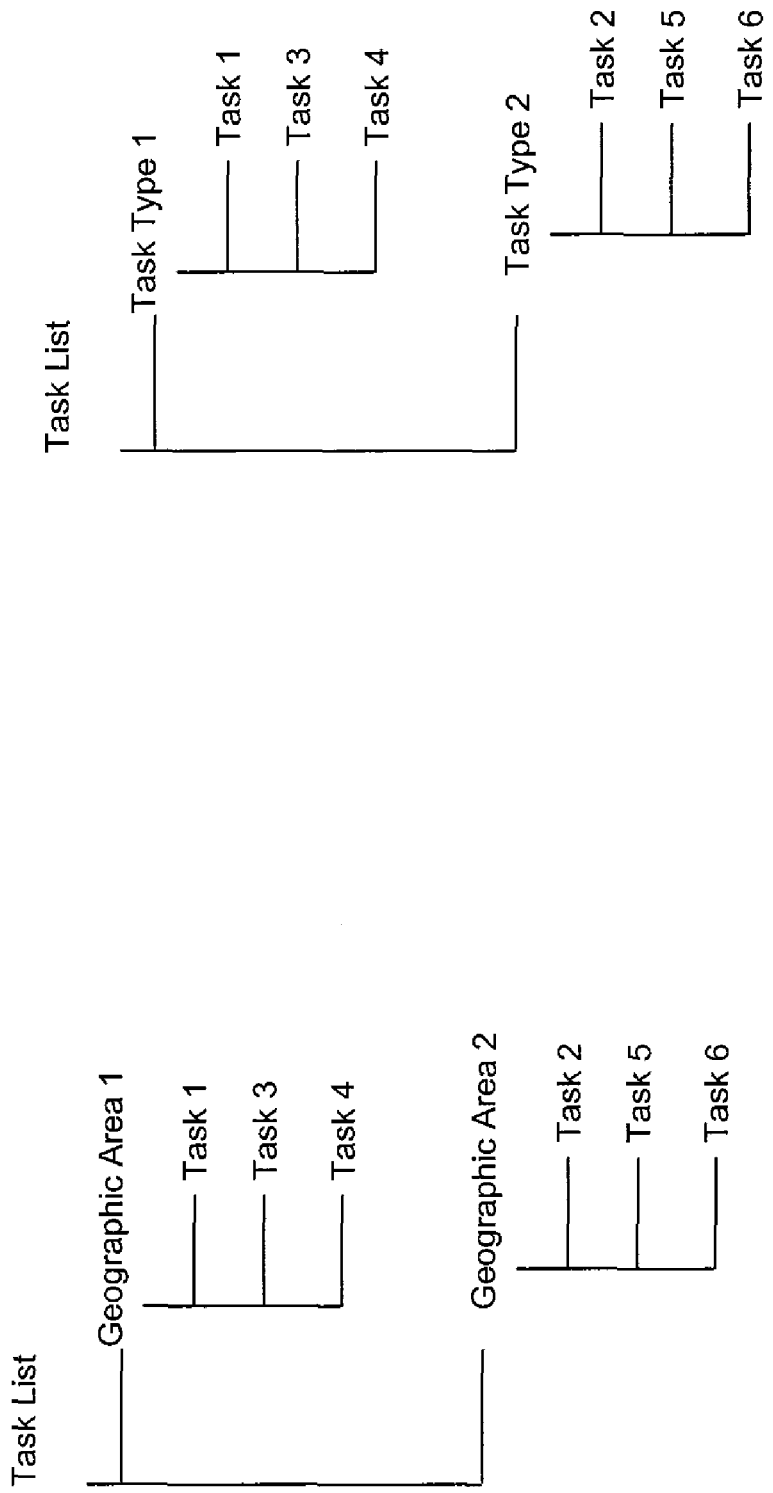

FIG. 8C illustrates an exemplary task list that is structured by geographic area. The unstructured task list of FIG. 8A can include geographic information associated with one or more of the tasks. Alternatively, or additionally, application server 600 can intelligently determine the geographic location based upon information describing the task. For example, if Task 1 is "Bring clothes to dry cleaner", then application server 600 can determine that a dry cleaner is located in Geographic Area 1. Presence information can be used to dynamically structure the list based on a user's current geographic location. Moreover, application server 600 can access an address book service for members of the task list group to identify a dry cleaner used by one or more of the members, and use information provided by the address book service to identify the geographic area of different tasks.

FIG. 8D illustrates exemplary task list structured by task type. For example, a Task Type 1 could be "Shopping" and Task 1 is grocery shopping, Task 3 is clothes shopping, and Task 4 could be hardware store shopping. Similarly, Task Type 2 could be "Taxes" and Task 2 is "collect W-2s", Task 5 is "collect charity receipts" and Task 6 is "contact accountant".

Although the task list structures of FIGS. 8B-D are illustrated separately, they can be combined. For example, a task list can be structured by geographic area, then task type, and then user. Moreover, the task list structures described above and illustrated in FIGS. 8B-8D are merely exemplary and many variations of these task list structures can be employed with the present invention. Additionally, the structured task lists can include the unique group identification, user preferences, the identifications of each group member and the address of application server 600. Although not illustrated, a task can appear in multiple categories, e.g., Task 2 can appear in the "Geographic Location 1" category and the "Task Type 1" category of a list.

Returning now to FIG. 7, application server 600 sends a request to create a task list group to group server 120 (step 720). The request can include a structured or unstructured task list, as well as an identification of one or more users associated with the list. Group server 120 creates a globally unique group identification, stores the identification with the users and the list of objects, and sends a Notify message with the globally unique group identification to Users A and B and application server 600 (steps 725*a*-725*c*). The Notify message can also include the structured list. Alternatively, or additionally, upon receipt of the Notify message, application server 600 can send the structured list to Users A and B. The Notify message can be sent to User B due to the user being a member of the task list group when it was created or due to an earlier subscription to groups created by User A.

When User A makes a change to the status of one of the tasks, an Update message is sent to application server 600 (step 730). The change in status could be, for example, that a task has been completed, that a task has been tentatively completed, that the task is in progress, etc. Object modification logic 630 updates the status of the task and then sends an Update message to group server 120 (step 735). Group server 120 then notifies User B of the update by sending a Notify message (step 740). Similarly, when User B changes the status of one of the task, User B sends an Update message to application server 600 (step 745), object modification logic 630 updates the status of the task and then sends an Update message to group server 120 (step 750). Group server 120 then sends a Notify message to User A (step 755). Users can be notified of changes to the status of tasks by an explicit message on the communication unit (e.g., highlighting the updated tasks in the task list or displaying a message similar to a missed call message), or the status change can be automatically incorporated into the task list on the communication unit without explicitly notifying the user.

Assume now that User B decides to delegate a task to User C. Accordingly, User B sends an Update message indicating delegation of one or more tasks to application server 600 (step 760). Application server 600 then updates the group list by sending a message to application server 120 (step 765). Because User A is the group creator, group server 120 sends a Notify message requesting authorization to delegate the task (step 770). User A can then respond with a message authorizing the delegation of the task (step 775). Group server 120 adds User C to the group task list and sends a Notify message to User C with the delegated task (step 780).

Although not illustrated above in connection with FIGS. 4 and 7, a group creator or other authorized member of the group can, at any time, modify the list of non-communication address objects, such as to add or delete objects from the list. In the methods described above the group server is acting as a proxy on behalf of a list creator to create groups composed of non-communication address objects and authenticate the credentials of the list creator with the group server.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of supporting groups comprising non-communication address objects, the method comprising the acts of:
   receiving a request to create a group comprising a list of non-communication address objects;
   generating a unique group identification for the group;
   storing the unique identification, an identification of a creator of the group and the list of the non-communication address objects; and
   managing the group,
   wherein the list of non-communication address objects is a shopping list, and a subscriber of the group has a subscription to an item in the shopping list, a category of the item in the shopping list or to groups of the creator of the group.

2. The method of claim 1, wherein the act of managing the group comprises at least one of the acts of:
   responding to a request for the list of non-communication address objects;
   modifying a status of one of the non-communication address objects;
   providing the unique group identification and at least one of the non-communication address objects to the subscriber of the group of the at least one of the non-communication address objects; or
   providing the unique group identification and at least one of the non-communication address objects to a user identified in the request, in response to a request for the list from a subscriber of the group of the at least one of the non-communication address objects.

3. The method of claim 1, wherein the unique identification, identification of the group creator and the list of non-communication address objects are stored in an eXtensible Markup Language (XML) document.

4. A method of supporting groups comprising non-communication address objects, the method comprising the acts of:
   receiving a request to create a group comprising a list of non-communication address objects;
   generating a unique group identification for the group;
   storing the unique identification, an identification of a creator of the group and the list of the non-communication address objects; and
   managing the group,
   wherein the list of non-communication address objects is a task list, and the method further comprises the acts of:
   receiving a request to delegate a task;
   receiving authorization to delegate the task; and
   modifying the status of the task to indicate delegation of the task.

5. The method of claim 4, wherein the status is one of completed, pending, or tentative.

6. A method of supporting groups comprising non-communication address objects, the method comprising the acts of:
   receiving a request to create a group comprising a list of non-communication address objects;
   generating a unique group identification for the group;
   storing the unique identification, an identification of a creator of the group and the list of the non-communication address objects; and managing the group, wherein the request to create the group is received by a group server from an application server, and the application server performs the acts of:

receiving an unstructured list of the non-communication address objects;

structuring the list of non-communication address objects; and transmitting the structured list to the group server.

7. A method for supporting groups comprising non-communication address objects, the method comprising the acts of:

receiving a request to create a group comprising a list of non-communication address objects;

obtaining a unique group identification for the group;

receiving a request to modify a status of at least one of the non-communication address objects; and notifying a group member of the modification.

8. The method of claim 7, wherein the list of non-communication address objects is a shopping list, and the request to modify the status of the at least one of the non-communication address objects is an offer for sale for the at least one of the non-communication address objects.

9. The method of claim 7, wherein the list of non-communication address objects is a task list, and the request to modify the status of the at least one of the non-communication address objects is a request to modify the status to one of completed, pending, or tentative.

10. The method of claim 7, wherein the list of non-communication address objects is a task list, and the request to modify the status of the at least one of the non-communication address objects is a request to delegate a task.

11. The method of claim 10, wherein when the request to modify the status of the task is received from a communication unit other than one associated with a creator of the group, the group member notified of the modification is the creator of the group, and the method further comprises the acts of:

receiving, from the creator of the group, an authorization message for the delegation of the task;

allowing the delegation of the task when the authorization message authorizes the delegation; and denying the delegation of the task when the authorization denies the delegation.

12. The method of claim 7, wherein the request is received from a first group member and the notified group member is a second group member.

13. The method of claim 7, further comprising the act of: sending a notification of the group creation.

14. The method of claim 13, wherein the notification is sent to a communication unit identified in the request to create the group.

15. The method of claim 13, wherein the notification is sent to a communication unit that subscribes to groups of a communication unit that requested the group creation.

16. The method of claim 7, wherein a status of at least one of the non-communication address objects is updated based upon presence information indicating a current geographical location of a member of the group.

* * * * *